April 24, 1934.  L. A. DUMSER  1,955,954
BACK-LASH COMPENSATOR
Filed Nov. 2, 1931
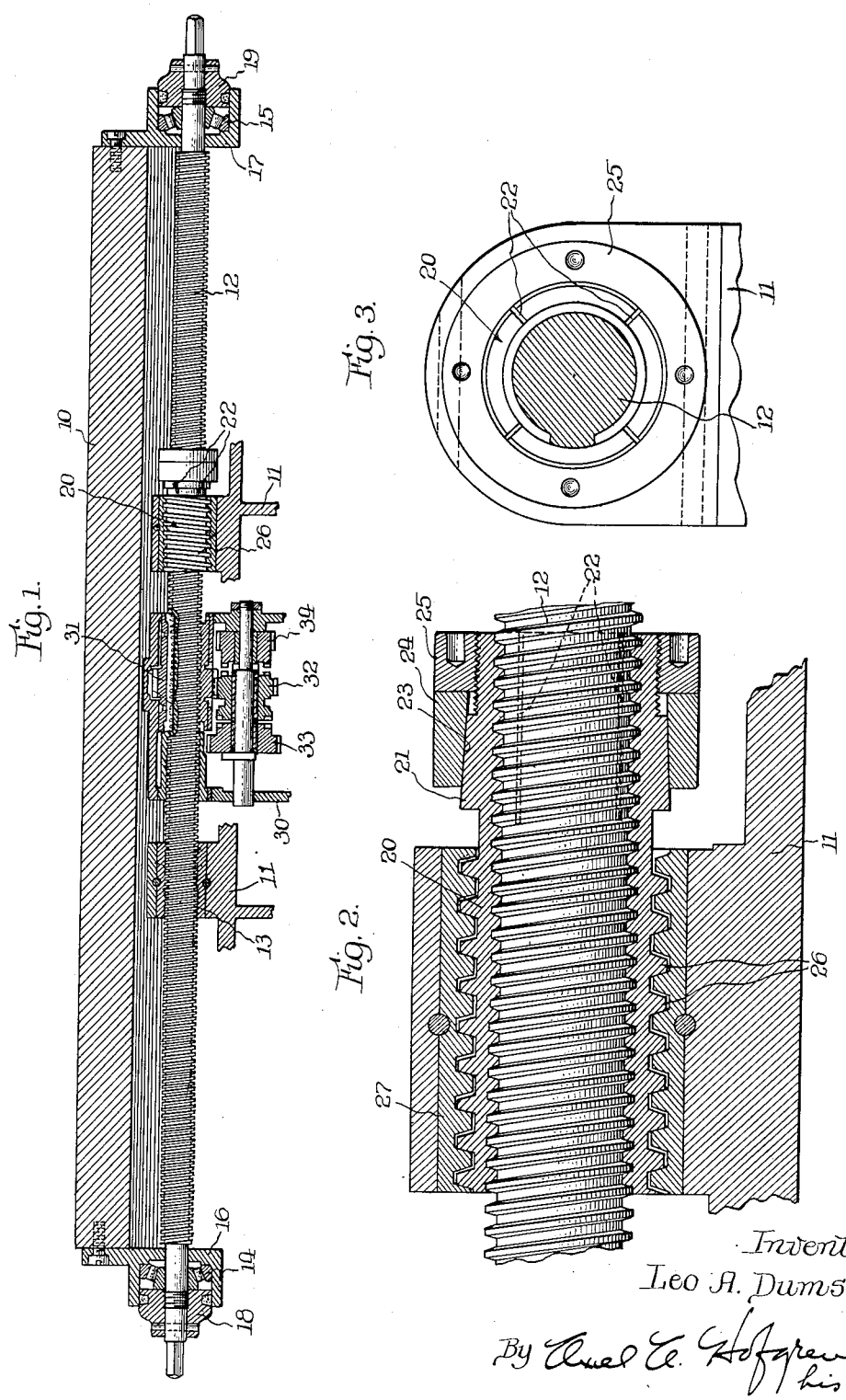
Inventor
Leo A. Dumser,
By Oscar A. Hofgren
his Atty.

Patented Apr. 24, 1934

1,955,954

UNITED STATES PATENT OFFICE 1,955,954

BACK-LASH COMPENSATOR

Leo A. Dumser, Rockford, Ill., assignor to Sundstrand Machine Tool Co., Rockford, Ill., a corporation of Illinois Application November 2, 1931, Serial No. 572,592

7 Claims. (Cl. 90—22)

This invention relates generally to improvements in feeding mechanisms for machine tool supports and more particularly to an improved screw and nut device in which lost motion between the parts is effectively and automatically prevented.

It is the general object of the invention to provide a new and improved screw and nut mechanism which is simple in construction and efficient in operation and which will effectively prevent lost motion between the parts during operation.

Another object of the invention is to provide such an improved mechanism wherein lost motion is prevented for both directions of feed screw rotation.

A further object is to provide, in combination with a screw and nut, a supplemental nut carrying means for contracting a portion of the nut into frictional engagement with the screw so that the nut will tend to rotate with the screw, together with means for forcing the nut longitudinally of the screw so as to take up lost motion in both directions of screw rotation.

Other objects and advantages will become apparent from the following detailed description taken in connection with the accompanying drawing, in which:

Figure 1 is a fragmentary section through the base and table of a milling machine illustrating a preferred form of the invention applied thereto.

Fig. 2 is an enlarged fragmentary section through the supplemental nut.

Fig. 3 is a view looking at the right-hand end of Fig. 2, the feed screw being shown in section.

While I have shown in the drawing and shall herein described in detail the preferred form of my invention as embodied in a screw and nut mechanism for actuating the table of a milling machine, it is to be understood that I do not thereby intend to limit the invention to the specific form or application disclosed, but aim to cover all modifications and alternative constructions falling within the spirit and scope of the invention as expressed in the appended claims.

As illustrated in the drawing, a table or member 10 is slidably mounted on a base or support 11 and is arranged to be reciprocated thereon by means including a feed screw 12 which is rotatably mounted on the table and a nut 13 non-rotatably secured to the base. The screw is rotatably mounted by means of roller bearings 14 and 15 positioned in end brackets 16 and 17 secured to the table 10 and having portions abutting the outer races of the bearings. Preferably screw threaded take-up devices 18 and 19 are adjustably mounted on the ends of the screw so that they may be tightened against the inner races of the bearings to place the screw under a normal working tension. This effectively prevents any end play between the screw and support and also subjects the screw to an initial elongation and thereby eliminates lost motion in the screw itself.

For eliminating lost motion between the screw 12 and nut 13, the invention in its preferred form provides a supplemental nut 20 in the form of a sleeve which is threaded onto the screw. One end 21 of said sleeve is preferably split at 22 and provided with a tapered portion 23 which is engaged by a correspondingly tapered clamping ring 24. This ring may be adjusted longitudinally of the sleeve by means of a screw threaded collar 25 for the purpose of contracting the end of the sleeve into proper frictional engagement with the screw so that the sleeve will tend to rotate with the screw. In order to move the supplemental nut longitudinally of the screw to take up lost motion, the periphery of the sleeve is preferably threaded as at 26 with a thread opposite to that of the screw 12 and which engages a corresponding thread in a nut 27 secured to the base 11. This thread is sufficiently loose so that the friction between the parts is less than between the supplemental nut and the screw, and is preferably provided with a helix angle sufficiently great to prevent jamming. An angle of approximately 4° has been found successful.

As illustrated in the drawing, the main nut 13 and supplemental nut 20 are mounted on the base 11 on opposite sides of a feed box 30. In this feed box there is rotatably mounted a gear 31 which has a splined connection with the screw 12. This gear meshes with a second gear 32 which is provided with clutch teeth on its opposite ends arranged for engagement with corresponding teeth on adjacent gears 33 and 34, which normally rotate in opposite directions. Since the specific driving mechanism for the clutch gears forms no part of the present invention, it is not illustrated in further detail.

In Fig. 2 the thread 26 is shown rather loose in the nut 27. With the friction between the supplemental nut and screw adjusted so that it is greater than the friction between the thread 26 and the nut 27, the supplemental nut will rotate with the screw and will move longitudinally toward or away from the main nut 13 (depending upon the direction of rotation of the screw 12) until the back-lash between the screw 12 and nut 13 is taken up.

When the feed screw is rotated in a clockwise direction (Fig. 3) the supplemental nut 20 rotates therewith for a short distance and, due to the action of the thread 26, the supplemental nut moves longitudinally away from the main nut so as to take up the lost motion between the nut and screw. Thereafter the screw 12 will rotate in the supplemental nut. Upon reversing the screw the supplemental nut again rotates therewith until the lost motion is taken up in the opposite direction, the supplemental nut then moving toward the main nut to take up against the opposite side of the thread on the screw 12. Thus the supplemental nut will rotate with the feed screw, upon each reversal of feed screw rotation, until the back-lash is taken up.

I claim as my invention:

1. In a machine tool, in combination, a base, a member slidably mounted on said base, a feed screw rotatably mounted on said member, a nut engaging said feed screw and secured to said base, a sleeve threaded on said screw and having one end split, a nut secured to said base having a thread in the opposite direction from said screw, screw threads on said sleeve engaging said nut, and means for contracting the split end of the sleeve into frictional engagement with the screw.

2. In a machine, in combination, a base, a member slidably mounted on said base, a screw and nut device for actuating said member, one element of which is rotatably mounted on said member and the other on said base, a sleeve threaded on said screw constituting a supplemental nut, means for contracting said sleeve to adjust the friction between the sleeve and screw so that the sleeve will rotate with the screw due to the frictional engagement until the back-lash is taken up between the screw and nut, and means for moving said sleeve longitudinally of said nut when the sleeve is rotated by said frictional engagement so that when the screw is rotated in one direction the sleeve will rotate with the screw and move toward said nut until the back-lash is taken up between the screw and nut in one direction, and when the screw is rotated in the opposite direction the sleeve will rotate with the screw in said opposite direction and move away from said nut until the lost-motion is taken up between the screw and nut in the opposite direction.

3. In a machine, in combination, a support, a member movably mounted on said support, means for reciprocating said support comprising a feed screw, a pair of nuts engaging said screw, one of which is non-rotatable and the other rotatable, means for rotating the screw in forward and reverse directions, means for reciprocating the rotatable nut longitudinally with respect to the non-rotatable nut when it is rotated in forward and reverse directions with respect to the non-rotatable nut, and means for rotating the rotatable nut comprising means for frictionally engaging said rotatable nut directly with the screw so that the rotatable nut is driven by the screw due to the frictional engagement therewith so as to rotate the rotatable nut relatively to the non-rotatable nut and thereby force said nuts toward each other when the screw is rotated in one direction, and away from each other when the screw is rotated in the opposite direction, thereby to take up the back-lash between the screw and non-rotatable nut for both directions of screw-rotation.

4. In a machine, in combination, a support, a member movably mounted on said support, a feed screw rotatably mounted on said member, a stationary nut on said support, means for rotating the screw in forward and reverse directions, a supplemental nut engaging said screw and having a thread of a different lead on its periphery, a second stationary nut engaging the peripheral thread on said supplemental nut, and means for engaging said supplemental nut frictionally directly with the screw so that the supplemental nut is driven by the screw due to the frictional engagement therebetween, thereby to rotate said supplemental nut relative to the stationary nut and move the nuts toward each other when the screw is rotated in one direction and away from each other when the screw is rotated in the opposite direction.

5. In a machine tool, in combination, a stationary part forming a support, a movable part slidably mounted on the said support, a screw and nut device for moving one of said parts relatively to the other, one element of said device being rotatably mounted on one of said parts and the other element of said device being non-rotatably mounted on the other of said parts, and means for eliminating back-lash between said screw and nut comprising a supplemental nut threaded on the screw, means for frictionally engaging said supplemental nut directly with the rotatable element of the said device so that it will rotate therewith when there is back-lash between the screw and nut, and means for moving said supplemental nut longitudinally relatively to the other nut when the supplemental nut is rotated by said frictional engagement with the screw, said supplemental nut rotating with the screw until the back-lash between the elements of the screw and nut device is taken up.

6. In a machine, in combination, a support, a member movably mounted on said support, a feed screw rotatably mounted on said member, a stationary nut on said support, means for rotating the screw in forward and reverse directions, a supplemental nut engaging said screw and having a thread on its periphery of opposite hand from the thread on the screw, a stationary nut engaging the thread on said supplemental nut, and means for engaging said supplemental nut frictionally with the screw to rotate said nut relatively to the stationary nut and move the nuts toward each other when the screw is rotated in one direction and away from each other when the screw is rotated in the opposite direction.

7. In a machine tool, in combination, a stationary part forming a support, a movable part slidably mounted on the said support, a screw and nut device for moving one of said parts relatively to the other, one element of said device being rotatably mounted on one of said parts and the other element of said device being non-rotatably mounted on the other of said parts, and means for eliminating back-lash between said screw and nut comprising a supplemental nut threaded on the screw and having a thread on its periphery of different hand than that of the feed screw, and means for frictionally engaging said supplemental nut directly with the rotatable element of said device so that it will tend to rotate therewith.

LEO A. DUMSER.